July 18, 1933.          R. J. NEEDHAM          1,918,419
MEANS FOR LOADING AND UNLOADING CARS
Filed Sept. 1, 1931          3 Sheets-Sheet 1
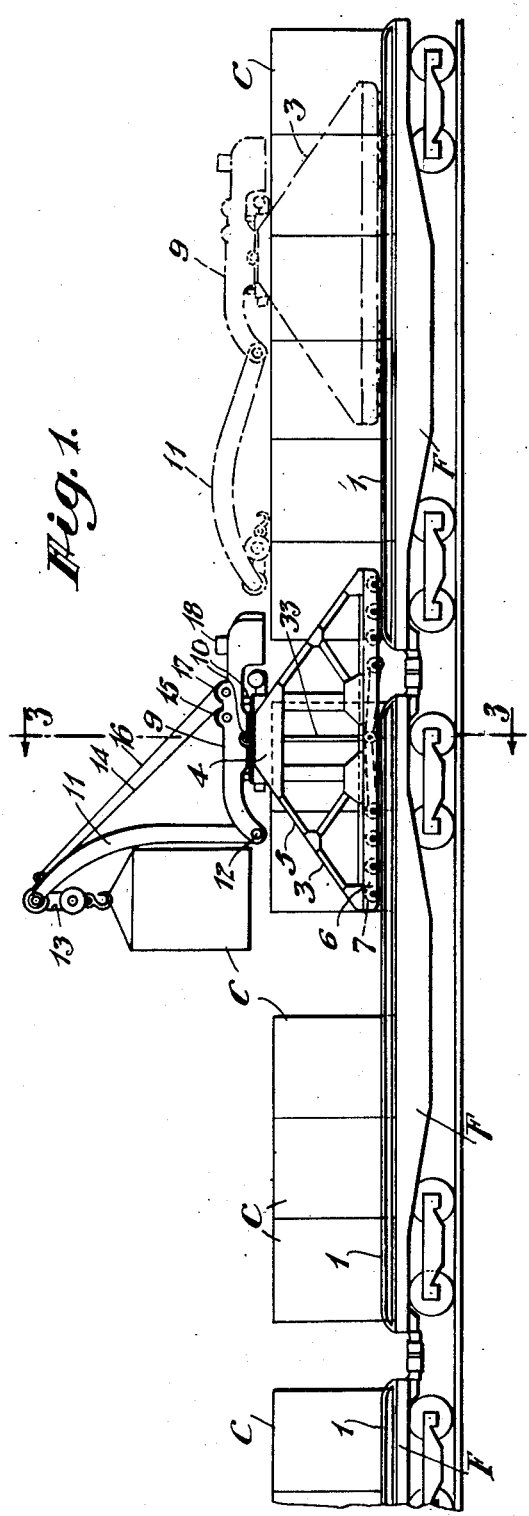
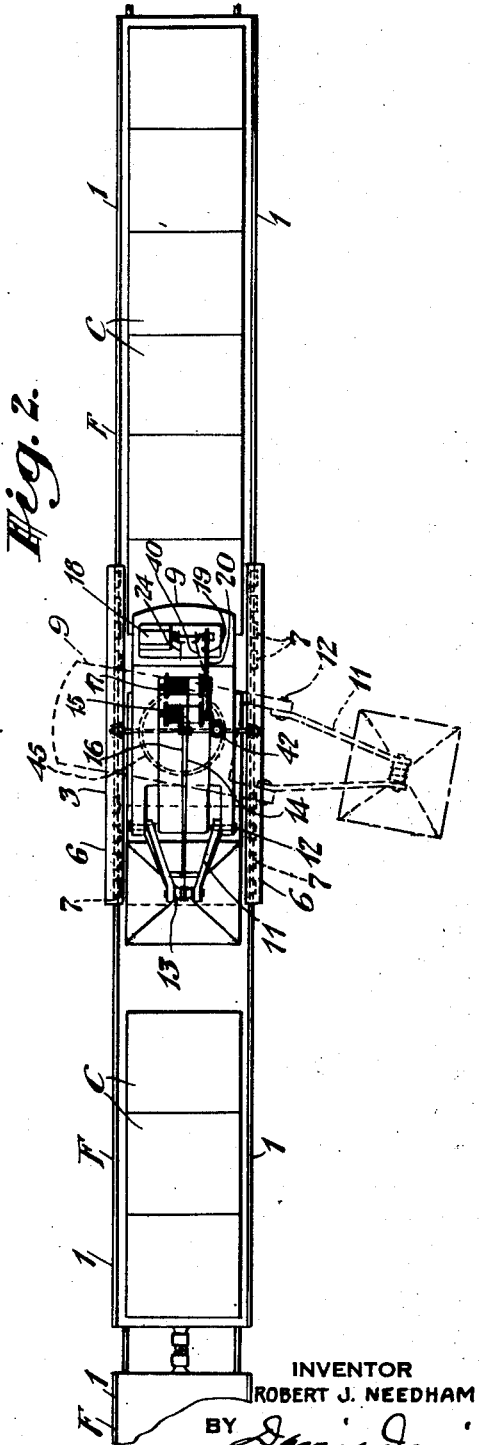
INVENTOR
ROBERT J. NEEDHAM
BY *Davies Davis*
ATTORNEYS

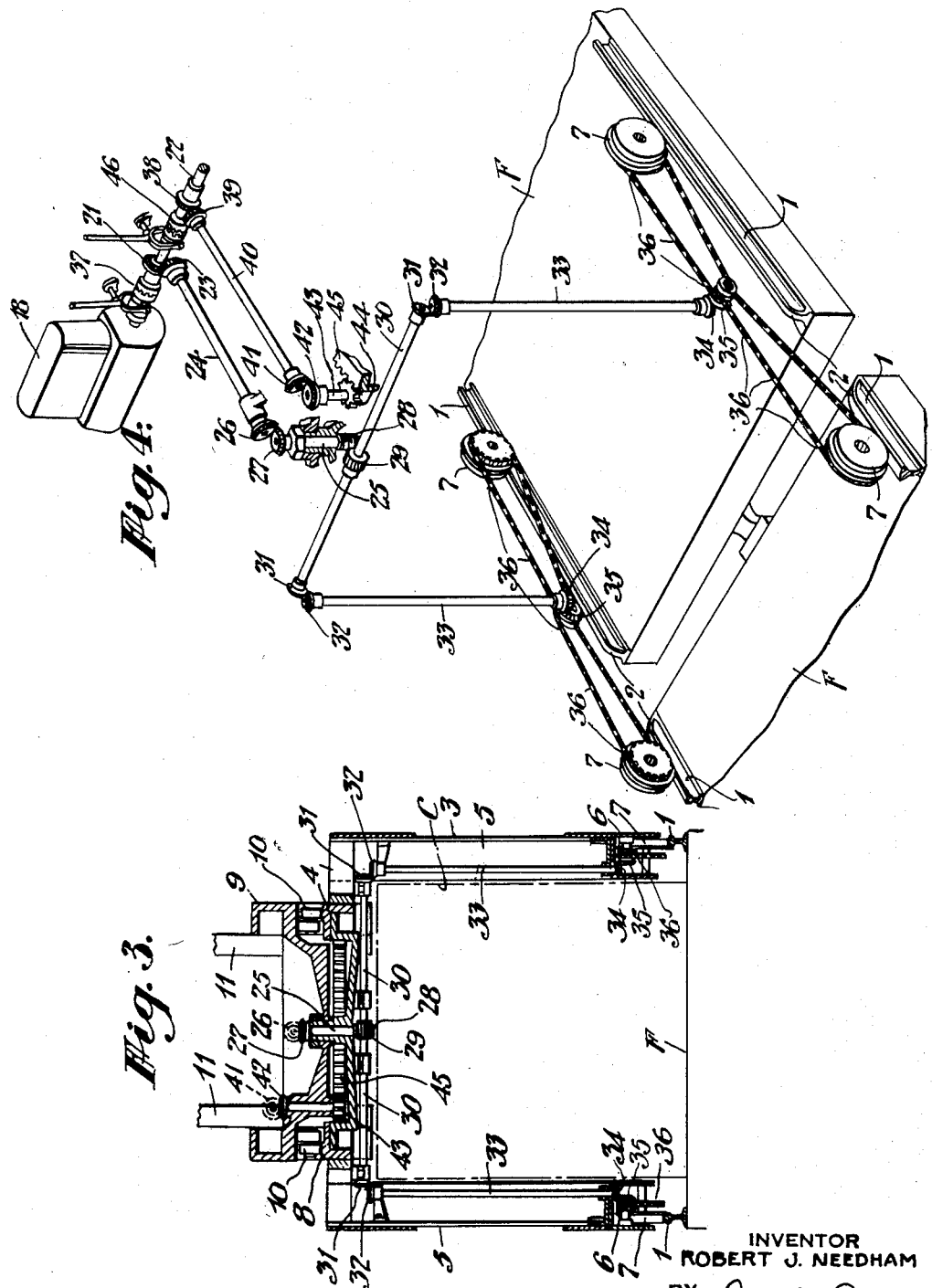

July 18, 1933.  R. J. NEEDHAM  1,918,419
MEANS FOR LOADING AND UNLOADING CARS
Filed Sept. 1, 1931    3 Sheets-Sheet 3
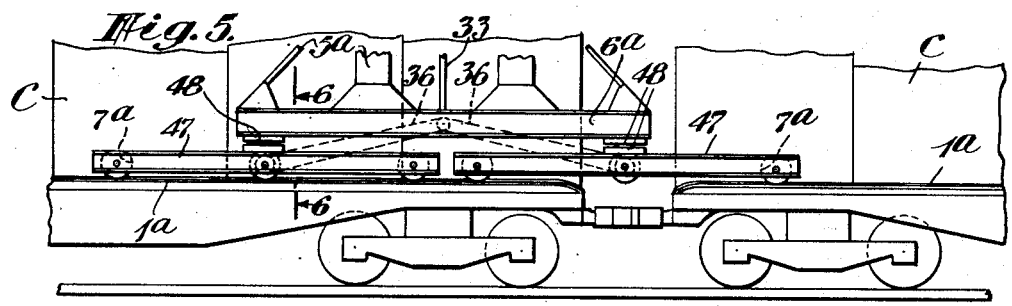
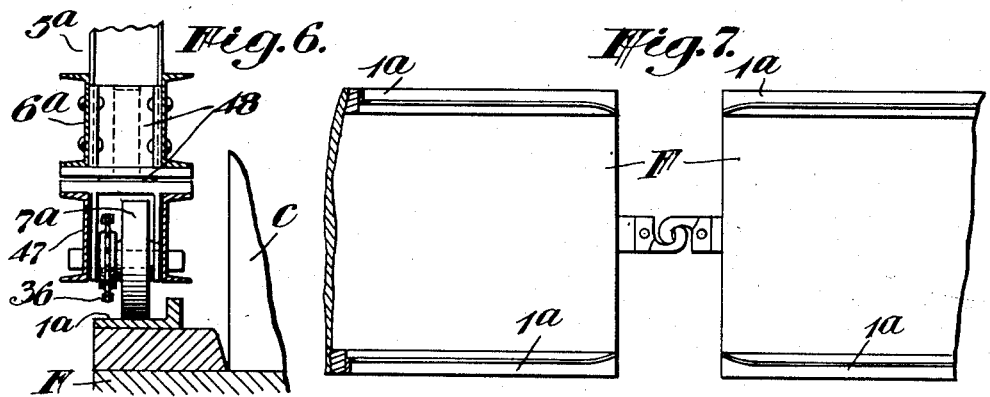
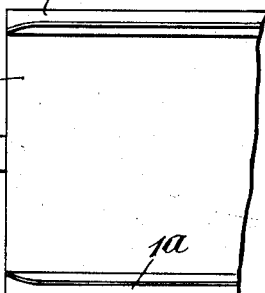
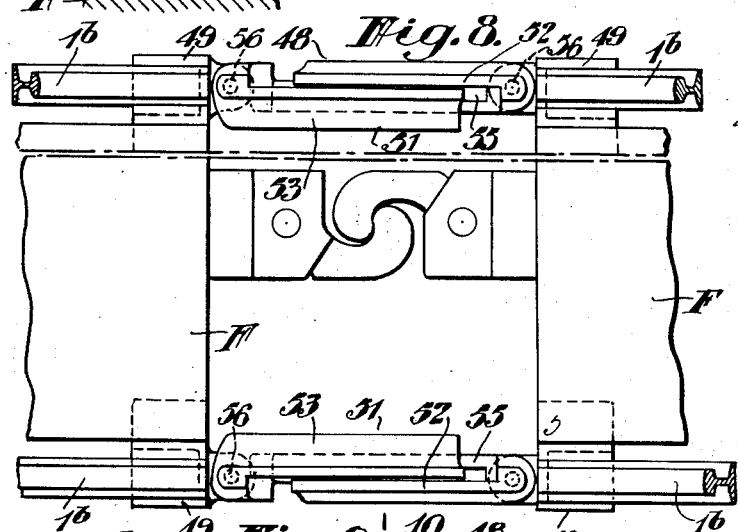
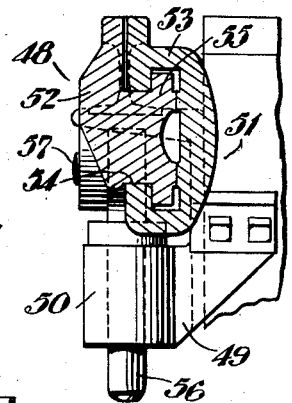
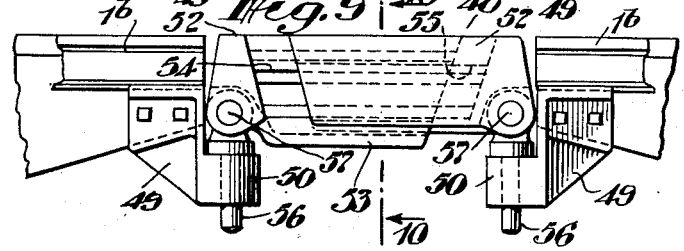
INVENTOR
ROBERT J. NEEDHAM
BY
ATTORNEYS Patented July 18, 1933

1,918,419

UNITED STATES PATENT OFFICE

ROBERT J. NEEDHAM, OF TORONTO, ONTARIO, CANADA

MEANS FOR LOADING AND UNLOADING CARS

Application filed September 1, 1931. Serial No. 560,648.

Important objects of the present invention are, to provide apparatus for facilitating the loading and unloading of freight cars; to provide means for conveniently handling large, cubical cargo containers which are shipped upon flat cars; to provide apparatus for conveniently loading and unloading freight cars without the necessity of shifting and shunting them into a fixed loading or unloading position; and to provide a freight train with a load transfer means which is transported upon the train and is traversable therealong from car to car to convenient positions for loading and unloading the cars. Other objects of the invention will appear hereinafter.

Fig. 1 is a side view of several coupled flat cars equipped with my loading and unloading means;

Fig. 2 a plan view thereof;

Fig. 3 an enlarged vertical section taken on the line 3—3 of Fig. 1;

Fig. 4 a diagrammatic perspective view of the power-driven means for propelling the truck and rotating the turntable thereon;

Fig. 5 a fragmentary side view showing a truck of modified design for the loading and unloading means;

Fig. 6 an enlarged detail section taken on the line 6—6 of Fig. 5;

Fig. 7 a top plan view of the opposed ends of two coupled flat cars showing rails of modified form for supporting the truck;

Fig. 8 a top plan view showing telescoping bridge rails connecting truck rails upon successive cars;

Fig. 9 a side view showing the telescoping bridge rails; and

Fig. 10 an enlarged detail section taken on the line 10—10 of Fig. 9.

My invention is illustrated as applied to a freight train comprising a number of coupled flat cars F. Upon the cars there is indicated a number of large, cubical, metal cargo containers C. These containers form housings for individual freight consignments forming partial carloads. The invention is directed primarily to the convenient and expeditious loading and unloading of these containers. Upon each car of the train there is fixed a pair of rails 1 disposed at opposite sides of the load supporting area of the car and extending approximately the entire car length. At the ends of the rails the treads thereof slope downward as at 2. The rails of successive cars are normally in endwise alinement and they form a track for a truck 3 which bears a hoisting apparatus and is traversable along the train from car to car to bring the hoisting apparatus to a loading or unloading point upon any one of the cars.

The truck 3 has a yoke-like form in cross section which enables it to straddle and clear the containers C. It comprises a top portion 4, supported above the level of the containers, and side members 5 rigidly fixed to the top portion and depending therefrom outwardly of the containers. Each side member 5 is a rigid metal frame approximately triangular and having a rather long base formed by a beam 6. The base has flanged supporting wheels or rollers 7 for traveling upon the car rails and said wheels are arranged in two rows near the opposite ends of the base. Each row of wheels is of sufficient length to bridge the rail gap between successive cars.

A circular track 8 upon the upper side of the top of the truck 3 supports a turntable 9 having flanged supporting wheels or rollers 10 to travel upon the track. The turntable forms an elongated platform upon which is mounted the hoisting apparatus. The latter includes a boom 11 hinged, as at 12, to one end of the platform. A hoisting tackle 13 including cable and pulleys and a hook, is carried by the outer end of the boom and a reach of cable 14 for operating the tackle extends to a winding drum 15 carried by the turntable. Another cable 16 for raising the boom leads to a winding drum 17 carried by the turntable. Power means 18, preferably either a gas engine or an electric motor, is also carried by the turntable and has driving connections, diagrammatically indicated at 19 and 20, with said winding drums. These driving connections are controlled in any suitable manner. There are driving connections between the engine or motor, and certain of the truck wheels 7, for propelling the truck along the rails 1. These driving connections may be of any suitable form. In the present instance a bevel gear 21 upon the power shaft 22 meshes with a bevel gear 23 upon a shaft 24 which is operatively connected to a shaft 25 at the center of the turntable by bevel gears 26 and 27. A worm 28 fixed to shaft 25 meshes with a worm wheel 29 fixed to a cross shaft 30 mounted upon the truck above the top level of the containers C. Bevel gears 31 are fixed to the opposite ends of shaft 30 and mesh with bevel gears 32 fixed to vertical shafts 33 mounted upon the side members 5 of the truck. Bevel gears 34 fixed to the lower ends of the shafts 33 mesh with bevel gears 35 having chain and sprocket driving connections 36 with the adjacent truck wheels 7. Upon the drive shaft 22 is a clutch 37 operable for making and breaking the driving connection between gear 21 and the shaft.

There is also a connection between the power shaft 21 and the turntable for rotating the latter. A bevel driving gear 38 upon the drive shaft 22 meshes with a bevel gear 39 upon a shaft 40. Another bevel gear 41 upon shaft 40 meshes with a bevel gear 42 upon a shaft 43. A spur gear 44, fixed to shaft 43, meshes with a toothed ring 45 fixed to the top of the truck. Upon the drive shaft 22 is a clutch 46 operable for making and breaking driving connection between the shaft and gear 38.

The top portion 4 is located centrally of the truck and high enough above the car floor to clear the predetermined car load space. The truck base is long enough to extend a considerable distance, longitudinally of the car, beyond that portion of the top which supports the weight of the hoisting apparatus so that as the ends of the truck base are projected across the space between two coupled cars the truck, as a whole, will not tilt and it will, therefore be unnecessary to employ auxiliary devices to assist in traversing the truck across the spaces between the coupled cars. At opposite sides of the central portion 4 of the truck the end portions of the truck are open at the top to permit the hoisting of loads disposed on the car in positions within the limits of the wheel base of the truck. The hoisting apparatus is also designed to render the tackle 13 operatively disposable for hoisting the loads so positioned. The truck is in the form of a bridge which straddles the car load space of the car, and of course the bridge portion of the truck may be made of any suitable height to bridge over and clear any predetermined car load space. The two sets of truck wheels 7 are preferably located beyond the load supporting portion of the top 4, so that the ends of the truck carrying said truck wheels may be projected across the gap or space between the coupled flat cars without permitting the truck as a whole to tilt endwisely.

The truck driving mechanism is connected to one pair of truck wheels of each end set. As shown in the drawing the driving mechanism is connected to the inner pair of truck wheels of each end set and these two driving pairs of wheels are located a suitable distance apart so that the space between the said driven truck wheels will be considerably greater than the space between the coupled cars. The purpose of this is to ensure at least one pair of driven truck wheels on the rails while the truck is passing from one car to the next. This is clearly illustrated in Fig. 4 of the drawings. It will be understood that additional wheels of the two sets may have driving connections with the power, if required. Preferably, as shown, the driven wheels of each group are disposed inward of non-driven wheels so that in crossing a gap between cars the non-driven wheels will precede the driven wheels to engage the rails ahead first and level off the truck before the driven wheels engage said rails.

The invention is designed to greatly facilitate the handling of the cargo containers. In loading the train, an operator upon the turntable starts the motor or engine and operatively connects it to the truck wheels for propelling the truck along the train to a position opposite a container upon the station platform or ground. Then, the turntable is mechanically rotated to bring the boom and tackle over the container, and the hook of the tackle is anchored to the container in any suitable manner, the boom and tackle are operated to hoist the container, and the turntable is rotated to position the hoisted container over the train. If the car space which is to receive the container is located at a position spaced along the train from the hoisting point and there are intervening containers upon the train the hoisted container is conveyed by the truck and hoisting apparatus along the train and over the tops of the intervening containers to the appropriate car space, whereupon the tackle is operated to lower it upon the car. Containers distributed at various loading points along the train may be conveniently reached by the hoisting apparatus and transferred to their car spaces. Thereby, shifting and shunting of the cars into loading positions is avoided.

In unloading, the truck is driven along the train to a position opposite a container to be removed, the container is hoisted and, if necessary, is conveyed along the train by the truck to a convenient unloading point. The turntable is then rotated to swing the container away from the train and the boom and tackle are operated to lower it. Thereby, car shifting is avoided in unloading also.

It will be seen that my invention avoids loading and unloading at congested fixed points and avoids car shifting to bring the car spaces or cargo into register with fixed hoisting apparatus at the stations. Cargo to be loaded may be conveniently distributed along the track wherever space is available, or, delivery trucks bearing the cargo may be driven into any available spaces along the train and the cargo may be conveniently transferred by the traveling hoisting apparatus to assigned spaces upon the train. Unloading is equally facilitated by conveyance of the cargo along the train to an available ground space or to a truck or other transfer means.

It is possible also to drive the truck from a car to an elevated platform having rails in register with the truck rails upon the car. Then the apparatus may be employed for loading and unloading the platform. Or, the truck may be driven along said platform to a repair shop or to a storage space.

While I have shown and described my invention in conjunction with flat cars it is adaptable for use upon different types of open top cars.

In Figs. 5 and 6 is shown a truck of modified design for supporting the hoisting apparatus. Here the two sets of truck wheels 7<sup>a</sup> at each side of the truck are mounted upon two beams 47, beneath the lower beams 6<sup>a</sup> of the truck side frames 5<sup>a</sup>. Each beam 47 is pivoted at a central point thereof to the adjacent beam 6<sup>a</sup>, as at 48, to enable the truck to turn slightly for passing from car to car when the train is upon a curve. In the present instance there are three wheels upon each beam 47 and the central wheel is driven through a driving connection like that previously described. The wheels in each set are spaced sufficiently to bridge the gap between cars.

The truck wheels 7<sup>a</sup> are unflanged and they travel upon rails 1<sup>a</sup> of modified form, shown in Figs. 5, 6 and 7. These rails are of angular cross section having a rather wide tread portion and an upstanding guide flange along its inner edge. At their ends the rail treads are widened and the guide flanges curve inward. These rails facilitate the travel of the truck from car to car around a curve.

Figs. 8, 9 and 10 show telescoping bridge rail structures 48' bridging the rail gaps between cars. The truck rails 1<sup>b</sup> are here shown as spaced slightly outward from the opposite sides of the cars and supported thereon by brackets 49. Said brackets have vertical sockets 50 depressed below the rails and projecting from the car ends. Each bridge structure 48' comprises rail sections 51 and 52 disposed longitudinally side by side and having side by side tread portions. Below its tread the section 51 forms a tubular guide 53 open at one end and having a longitudinal slot 54 in its side opposed to the section 52. The latter section has a guide rib 55 of substantially T-shaped cross section inserted endwise into said tubular guide of the companion section and slidably fitted therein. Thereby the rail sections are telescopically connected. At the outer end of each rail section is a depending coupling pin 56 having a head pivoted as at 57 to the rail section, and a shank removably inserted in one of the bracket sockets 50. The treads of the said sections are supported thereby in endwise register with the treads of the rails 1<sup>b</sup>. The telescoping bridges extend or shorten as required upon a curve and adapt themselves to variations in the gap between the cars. These pivoted pin mountings enable them to tilt vertically and accommodate themselves to variations in elevation of the coupled cars. If the service does not require the bridges, or if the cars are to be uncoupled the bridges are readily removable by merely lifting them to free their supporting pins from the bracket sockets.

What I claim is:

1. The combination of a plurality of coupled freight cars; track rails carried by said cars and extending along the opposite sides of the load-receiving spaces of the cars; a truck formed to straddle the load-receiving spaces of the cars and traversable upon said rails along the cars and from car to car across the gap between the cars; a hoisting apparatus carried by said truck; a swivel mounting for said hoisting apparatus adapting it to rotate about a vertical axis located at approximately the center of the truck; supporting wheels for the truck including fore-and-aft groups of wheels at each side of the truck each group including a power driven wheel, said driven wheels of the different groups at each side of the truck being spaced fore-and-aft of said axis of the hoisting apparatus and at a distance from each other exceeding the gap between the cars and the opposite end wheels of each group being spaced apart a distance exceeding said gap; power means carried by the truck and operatively connected to said driven wheels of the different wheel groups to propel the truck on the rails; and guide means at the ends of the rails to guide the truck wheels onto the rails of one car when the truck is driven across the gap from the other car and the cars are at an angle to each other on a curve with their rails out of alinement.

2. The combination of a plurality of coupled freight cars; track rails carried by said cars and extending along the opposite sides of the load-receiving spaces of the cars; a truck formed to straddle the load-receiving spaces of the cars and traversable upon said rails along the cars and from car to car across the gap between the cars; a hoisting apparatus carried by said truck; a swivel mounting for said hoisting apparatus adapting it to rotate about a vertical axis located at approximately the center of the truck; supporting wheels for the truck including fore-and-aft groups of wheels at each side of the truck each group including a power driven wheel, said driven wheels of the different groups at each side of the truck being spaced fore-and-aft of said axis of the hoisting apparatus and at a distance from each other exceeding the gap between the cars and the opposite end wheels of each group being spaced apart a distance exceeding said gap; and power means carried by the truck and operatively connected to said driven wheels of the different wheel groups to propel the truck on the rails.

3. The combination of a plurality of coupled freight cars; track rails carried by said cars and extending along the opposite sides of the load-receiving spaces of the cars; a truck formed to straddle the load-receiving spaces of the cars and traversable upon said rails along the cars and from car to car across the gap between the cars; a hoisting apparatus carried by said truck; a swivel mounting for said hoisting apparatus adapting it to rotate about a vertical axis; supporting wheels for the truck including groups of wheels at each side of the truck and disposed fore-and-aft of the truck center, each group including a power driven wheel, said driven wheels of the different groups at each side of the truck being spaced fore-and-aft a distance from each other exceeding the gap between the cars and the opposite end wheels of each group being spaced apart a distance exceeding said gap; and power means carried by the truck and operatively connected to said driven wheels of the different wheel groups to propel the truck on the rails.

4. The combination of a plurality of coupled freight cars; track rails carried by said cars and extending along the opposite sides of the load-receiving spaces of the cars; a truck formed to straddle the load-receiving spaces of the cars and traversable upon said rails along the cars and from car to car across the gap between the cars; a hoisting apparatus carried by said truck; supporting wheels for the truck including fore-and-aft groups of wheels at each side of the truck, each group including a power driven wheel and a non-driven wheel located nearer the adjacent end of the truck than said driven wheel, said driven wheels of the different groups at each side of the truck being spaced fore-and-aft at a distance from each other exceeding the gap between the cars and the opposite end wheels of each group being spaced apart fore-and-aft a distance exceeding said gap; and power means carried by the truck and operatively connected to said driven wheels of the different wheel groups to propel the truck on the rails.

5. The combination of a freight car having tracks along the opposite sides of the load-receiving space of the car; a wheeled truck traversable along said tracks and of yoke form in cross section to straddle the car load space; a hoisting apparatus carried by said truck; a swivel mounting for said hoisting apparatus on the truck adapting said apparatus to rotate about a vertical axis at approximately the center of the truck, the truck having a wheel base materially longer than the height of the truck and extending fore-and-aft materially from said swivel mounting, the truck opening upward fore-and-aft of said swivel mounting to permit the hoisting of loads disposed on the car in positions within the opposite limits of the wheel base and the hoisting apparatus having load suspension means operatively disposable for hoisting loads from said positions.

ROBERT J. NEEDHAM.